(12) United States Patent
Ogawa et al.

(10) Patent No.: US 8,150,590 B2
(45) Date of Patent: Apr. 3, 2012

(54) TWO-WHEELED MOTOR VEHICLE BRAKE CONTROL METHOD AND SYSTEM

(75) Inventors: Takahiro Ogawa, Yokohama (JP); Helge Westerfeld, Yokohama (JP); Manabu Kanno, Yokohama (JP)

(73) Assignee: Bosch Corporation, Tokyo (JP)

( * ) Notice: Subject to any disclaimer, the term of this patent is extended or adjusted under 35 U.S.C. 154(b) by 869 days.

(21) Appl. No.: 12/162,220

(22) PCT Filed: Jan. 27, 2006

(86) PCT No.: PCT/JP2006/301321
§ 371 (c)(1),
(2), (4) Date: Jul. 25, 2008

(87) PCT Pub. No.: WO2007/086135
PCT Pub. Date: Aug. 2, 2007

(65) Prior Publication Data
US 2009/0037063 A1    Feb. 5, 2009

(51) Int. Cl.
*B60T 8/1755*    (2006.01)
(52) U.S. Cl. ......................................... 701/70
(58) Field of Classification Search .............. 701/70, 701/71, 73–75; 303/9.64, 137–138, 144, 303/148–151, 157; 301/6.1, 6.9
See application file for complete search history.

(56) References Cited

U.S. PATENT DOCUMENTS

| | | | |
|---|---|---|---|
| 3,871,713 A | 3/1975 | Lister | |
| 5,116,108 A | 5/1992 | Sigl et al. | |
| 5,261,730 A | 11/1993 | Steiner et al. | |
| 5,324,102 A | 6/1994 | Roll et al. | |
| 5,386,366 A * | 1/1995 | Roll et al. | 701/70 |
| 5,984,429 A * | 11/1999 | Nell et al. | 303/113.4 |
| 6,672,437 B2 | 1/2004 | Beringer | |
| 7,302,331 B2 | 11/2007 | Meyers et al. | |
| 7,653,471 B2 | 1/2010 | Mattson et al. | |
| 2007/0185623 A1 | 8/2007 | Chen et al. | |
| 2008/0281487 A1 | 11/2008 | Milot | |
| 2009/0048753 A1 | 2/2009 | Ogawa et al. | |
| 2009/0055066 A1 | 2/2009 | Ono et al. | |
| 2010/0138122 A1 | 6/2010 | Westerfeld et al. | |
| 2010/0145574 A1 | 6/2010 | Mattson et al. | |
| 2010/0231032 A1* | 9/2010 | Ogawa et al. | 303/9.64 |

FOREIGN PATENT DOCUMENTS

| | | |
|---|---|---|
| JP | 5-97085 A | 4/1993 |
| JP | 7242166 A | 9/1995 |
| JP | 2727907 B2 | 12/1997 |
| JP | 2002-29397 A | 1/2002 |
| JP | 2002029403 A | 1/2002 |
| JP | 3416819 B2 | 4/2003 |

* cited by examiner

*Primary Examiner* — Yonel Beaulieu
(74) *Attorney, Agent, or Firm* — Ronald E. Greigg (57) ABSTRACT

A two-wheeled motor vehicle brake control method and system which immediately reduces the brake pressure of the front wheel when rear wheel lifting is detected regardless of whether or not the front wheel is skidding. The reduction in brake pressure can be an amount which corresponds to the amount of lifting. The reduction in brake pressure can be performed in a stepwise manner until lifting is no longer being detected; it can be performed in a stepwise manner with a limit on the number of steps; or it can be performed in a stepwise manner until a total pressure reduction amount is achieved.

4 Claims, 6 Drawing Sheets

TWO-WHEELED MOTOR VEHICLE BRAKE CONTROL METHOD AND SYSTEM

BACKGROUND OF THE INVENTION

1. Field of the Invention

The present invention relates to a two-wheeled motor vehicle brake control method and system and in particular to the rapid securement of the safety of a vehicle with respect to rear wheel lifting.

2. Description of the Related Art

Conventionally, it has been well known that, in two-wheeled motor vehicles, the larger the ratio between the height of the center of gravity of the vehicle and the inter-axial distance between the front and rear wheels is, the easier it is for the phenomenon of so-called lifting of the rear wheel to occur. Additionally, various technologies have been proposed with respect to such rear wheel lifting from the standpoint of securing the safety of the vehicle and the rider, and a technology that reduces brake pressure by a certain amount to thereby secure the safety of the vehicle when, for example, lifting of the rear wheel is detected and predetermined skidding or greater is occurring in the front wheel is well known as disclosed in Japanese Patent No. 3,416,819.

However, it is not the case that the aforementioned conventional technologies can always be applied regardless of differences in the conditions of the vehicle—that is, the weight of the vehicle body, the length of the vehicle body, and the height of the vehicle—and depending on differences in the conditions of the vehicle, there are also vehicles where a reduction of brake pressure becomes necessary before predetermined skidding or greater of the front wheel is detected.

Related application Ser. No. 12/161,367, filed Jul. 18, 2008, allowed; Ser. No. 12/162,223, filed Jul. 25, 2008, currently pending; Ser. No. 12/161,370, filed Jul. 18, 2008, currently pending; and Ser. No. 12/162,626, filed Jul. 30, 2008, currently pending, are directed to similar subject matter. The '367 application is directed to a brake control method and system which provides improved controllability with respect to rear wheel lifting; the '223 application is directed to a brake control method and system that can reliably control and prevent rear wheel lifting caused by an abrupt brake operation; the '370 application is directed to the rapid securement of the safety of a vehicle with respect to rear wheel lifting; and the '626 application is directed to a two-wheeled motor vehicle brake control method and system for securement of high safety with respect to rear wheel lifting by reducing a pressure increase gradient of a wheel cylinder pressure of the front wheel immediately after rear wheel lifting.

SUMMARY OF THE INVENTION

The present invention has been made in view of the above-described situation and provides a brake control method and system which, with respect to a vehicle where lifting of the vehicle body easily occurs to a relatively large extent even in a relatively early stage when rear wheel lifting is detected, enable more rapid and reliable securement of safety with respect to that rear wheel lifting.

According to a first aspect of the present invention, there is provided a two-wheeled motor vehicle brake control method comprising: immediately reducing the brake pressure of a front wheel when lifting of a rear wheel is detected.

In this configuration, for example, it is suitable to set the pressure reduction amount of the brake pressure in response to the magnitude of a predetermined parameter that becomes an index of lifting of the rear wheel and for the predetermined parameter to be vehicle body deceleration or an amount of change in vehicle body deceleration.

According to a second aspect of the present invention, there is provided a two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, capable of discharging brake fluid of the front wheel cylinder to a front reservoir as desired, and capable of detecting the occurrence of lifting of a rear wheel, wherein the brake control system is configured to immediately reduce the brake pressure of the front wheel when lifting of the rear wheel is detected.

In this configuration, for example, it is suitable to set the pressure reduction amount of the brake pressure in response to the magnitude of a predetermined parameter that becomes an index of lifting of the rear wheel and for the predetermined parameter to be vehicle body deceleration or an amount of change in vehicle body deceleration.

BRIEF DESCRIPTION OF THE DRAWINGS

FIG. 5 is a General characteristic line diagrams for describing the relationship between a change in brake pressure obtained by a front wheel cylinder and a rear wheel lifting detection signal in the third example whose control procedure is shown in FIG. 4, with FIG. 5(A) beg a general characteristic line diagram generally showing an example of a change in brake pressure obtained by the front wheel cylinder and FIG. 5(B) being a general waveform diagram generally showing an example of a change in the rear wheel lifting detection signal;

DETAILED DESCRIPTION OF THE PREFERRED EMBODIMENTS

Below, an embodiment of the present invention will be described with reference to FIG. 1 to FIG. 7.

It will be noted that the members and arrangements described below are not intended to limit the invention and can be variously modified within the scope of the gist of the invention.

Figure 1:
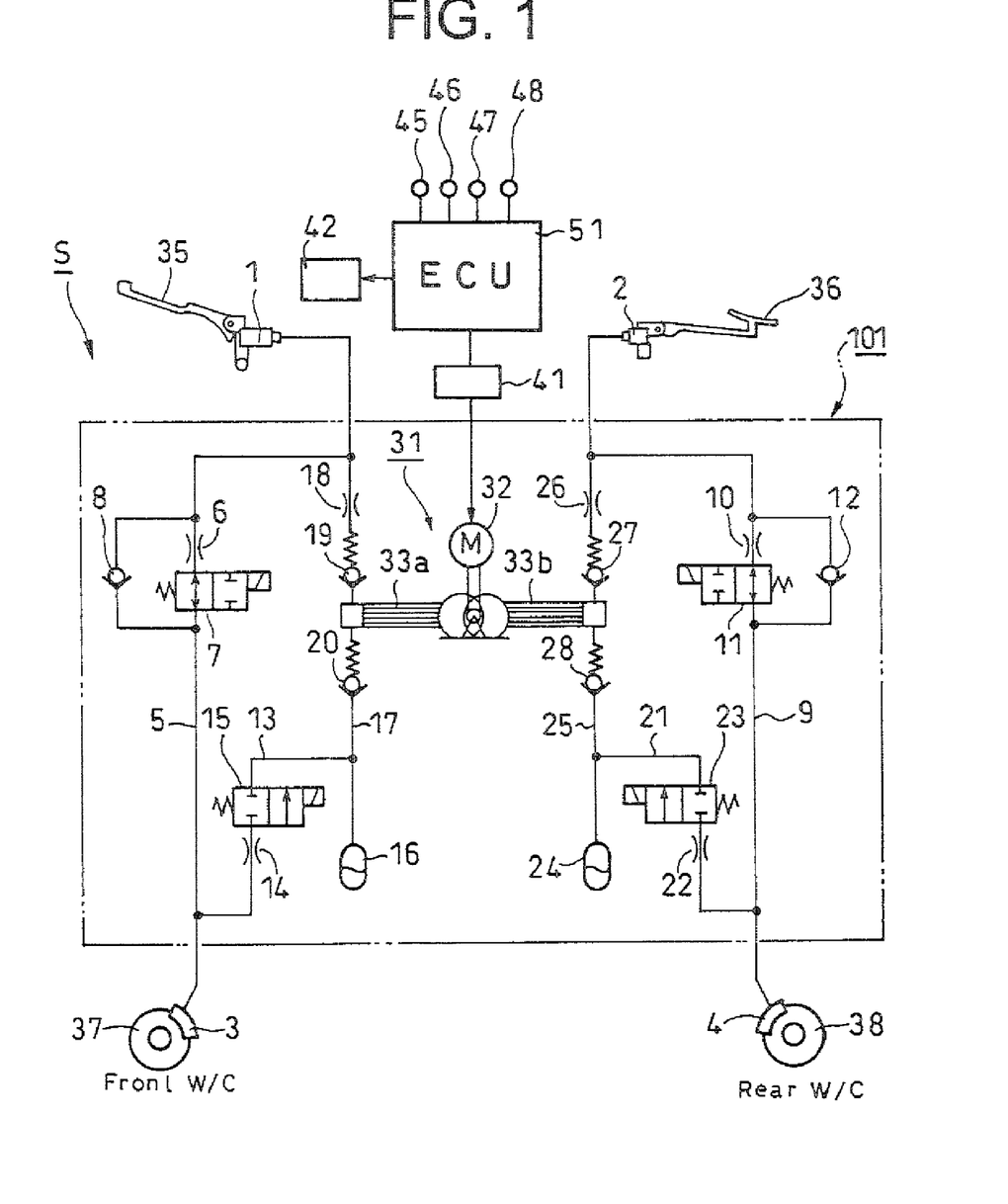
FIG. 1 is a configural diagram showing an example of the configuration of a two-wheeled motor vehicle brake control system in an embodiment of the present invention.

First, an example of the configuration of a two-wheeled motor vehicle brake control system in the embodiment of the invention will be described with reference to FIG. 1.

This brake control system S is broadly divided into a front brake master cylinder 1 that is disposed so as to be capable of converting the operational force of a brake handle 35 serving as a first brake operator into oil pressure, a rear brake master cylinder 2 that is disposed so as to be capable of converting the operational force of a brake pedal 36 serving as a second brake operator into oil pressure, a front wheel cylinder 3 that imparts brake force to a front wheel 37 in response to the oil pressure from the front brake master cylinder 1, a rear wheel cylinder 4 that imparts brake force to a rear wheel 38 in response to the oil pressure from the rear brake master cylinder 2, and an antilock brake control system 101 that is disposed between the front and rear brake master cylinders 1 and 2 and the front and rear wheel cylinders 3 and 4.

The front brake master cylinder 1 and the front wheel cylinder 3 are interconnected by a first main oil pressure tube 5, and a front main oil pressure tube-use throttle 6 and a first electromagnetic valve 7 that is ordinarily in an opened state are disposed in order from the front brake master cylinder 1 side midway along the first main oil pressure tube 5. Moreover, a front main oil pressure tube-use check valve 8 is disposed so as to bypass the front main oil pressure tube-use throttle 6 and the first electromagnetic valve 7 and in a direction where it deters the reverse flow of brake oil (brake fluid) from the front wheel cylinder 3 to the front brake master cylinder 1.

Similarly, the rear brake master cylinder 2 and the rear wheel cylinder 4 are interconnected by a second main oil pressure tube 9, and a rear main oil pressure tube-use throttle 10 and a second electromagnetic valve 11 that is ordinarily in an opened state are disposed in order from the rear brake master cylinder 2 side midway along the second main oil pressure tube 9. Moreover, a rear main oil pressure tube-use check valve 12 is disposed so as to bypass the rear main oil pressure tube-use throttle 10 and the second electromagnetic valve 11 and in a direction where it deters the reverse flow of brake oil from the rear wheel cylinder 4 to the rear brake master cylinder 2.

Further, a front reservoir connection-use oil pressure tube 13 is connected to an appropriate position of the first main oil pressure tube 5 between the first electromagnetic valve 7 and the front wheel cylinder 3, a front reservoir-use throttle 14 and a front reservoir inflow control-use electromagnetic valve 15 are disposed in order from the front wheel cylinder 3 side midway along the front reservoir connection-use oil pressure tube 13, and a front reservoir 16 is connected via these. Here, the front reservoir inflow control-use electromagnetic valve 15 is ordinarily in a closed state.

Moreover, a front return-use oil pressure tube 17 that is communicated with the front brake master cylinder 1 is connected to the front reservoir connection-use oil pressure tube 13 at an appropriate position between the front reservoir inflow control-use electromagnetic valve 15 and the front reservoir 16, and a front return path-use throttle 18, a first front return path-use check valve 19 and a second front return path-use check valve 20 are disposed in order from the front brake master cylinder 1 side midway along the front return-use oil pressure tube 17.

Further, basically similar to the configuration of the aforementioned first main oil pressure tube 5, a rear reservoir connection-use oil pressure tube 21 is connected to an appropriate position of the second main oil pressure tube 9 between the second electromagnetic valve 11 and the rear wheel cylinder 4, a rear reservoir-use throttle 22 and a rear reservoir inflow control-use electromagnetic valve 23 are disposed in order from the rear wheel cylinder 4 side midway along the rear reservoir connection-use oil pressure tube 21, and a rear reservoir 24 is connected via these. Here, the rear reservoir inflow control-use electromagnetic valve 23 is ordinarily in a closed state.

Moreover, a rear return-use oil pressure tube 25 that is communicated with the rear brake master cylinder 2 is connected to the rear reservoir connection-use oil pressure tube 21 at an appropriate position between the rear reservoir inflow control-use electromagnetic valve 23 and the rear reservoir 24, and a rear return path-use throttle 26, a first rear return path-use check valve 27 and a second rear return path-use check valve 28 are disposed in order from the rear brake master cylinder 2 side midway along the rear return-use oil pressure tube 25.

Moreover, an oil pressure pump device 31 that is shared between the front brake and the rear brake is disposed in the antilock brake control system 101. That is, the oil pressure pump device 31 is generally configured by a motor 32 and two plungers 33a and 33b that are reciprocally moved by an unillustrated fixed cam that is fixedly attached to an output shaft (not shown) of the motor 32.

Additionally, the one plunger 33a is connected between the first front return path-use check valve 19 and the second front return path-use check valve 20, the other plunger 33b is connected between the first rear red path-use check valve 27 and the second rear return path-use check valve 28, the brake oil of the front reservoir 16 is sucked up and refluxed to the front brake master cylinder 1 and the brake oil of the rear reservoir 24 is sucked up and refluxed to the rear brake master cylinder 2 by the reciprocating motion of the plungers 33a and 33b.

Control of the operation of each of the first and second electromagnetic valves 7 and 11, the front reservoir inflow control-use electromagnetic valve 15, the rear reservoir inflow control-use electromagnetic valve 23 and the motor 32 is performed by an electronic control unit (abbreviated as "ECU" in FIG. 1) 51.

The electronic control unit 51 is configured to be disposed with a microcomputer (not shown) that has a publicly known/commonly known configuration and memory elements (not shown) such as a RAM and a ROM.

The electronic control unit 51 executes various control programs for controlling the traveling of the vehicle that are stored in the unillustrated memory elements and performs various operation controls necessary for the driving and traveling of the vehicle. Examples of such operational controls of the vehicle include engine control, ABS control (Antilock Brake System), monitoring of the wheel velocities for determining whether or not there is an abnormality in wheel velocity sensors, and detection of rear wheel lifting. Moreover, in the embodiment of the present invention, later-described brake control processing is executed.

In order to perform the aforementioned control processing, detection signals of wheel velocity sensors 45 and 46 that are correspondingly disposed in order to detect the wheel velocities of the front wheel 37 and the rear wheel 38, a detection signal of a first pressure sensor 47 that detects the generated pressure of the front brake master cylinder 1 and a detection signal of a second pressure sensor 48 that detects the generated pressure of the front wheel cylinder 3 are inputted to the electronic control unit 51.

Moreover, detection signals of a brake lever actuation switch (not shown) that detects actuation of the brake handle 35 and a brake pedal actuation switch (not shown) that detects actuation of the brake pedal 36 are also inputted to the electronic control unit 51.

Further, a motor drive circuit 41 that generates and outputs a drive signal with respect to the motor 32 in response to a control signal from the electronic control unit 51 is disposed.

Moreover, an electromagnetic valve drive circuit 42 that controls the driving of the first and second electromagnetic valves 7 and 11, the front reservoir inflow control-use electromagnetic valve 15 and the rear reservoir inflow control-use electromagnetic valve 23 in response to control signals from the electronic control unit 51 is disposed. It will be noted that, in FIG. 1, the connections between the electromagnetic valve drive circuit 42 and the respective electromagnetic valves are omitted in order to simplify the drawing and make the drawing easier to understand.

It will be noted that the basic operation of the brake control system S of the aforementioned configuration is the same as that of this type of publicly known/commonly known brake control systems, so detailed description here will be omitted, but the overall operation will be generally described.

For example, when the brake handle 35 is operated in order to cause the brake to act, a predetermined detection signal corresponding to the fact that that operation has been detected by the brake lever actuation switch (not shown) that detects operation of the brake handle 35 is inputted to the electronic control unit 51. At the same time, brake fluid of an oil pressure corresponding to operation of the brake handle 35 is supplied from the brake master cylinder 1 to the front wheel cylinder 3, brake force is generated, and the brake force acts on the front wheel 37.

Then, in the electronic control unit 51, when it is judged that antilock brake control is necessary, the first electromagnetic valve 7 is excited, the first main oil pressure tube 5 is placed in a non-communicated state, and the oil pressure of the front wheel cylinder 3 is maintained at a constant. Then, in the electronic control unit 51, when it is judged that the brake should be eased, the front reservoir inflow control-use electromagnetic valve 15 is excited. As a result, the brake fluid of the front wheel cylinder 3 is discharged to the front reservoir 16 via the front reservoir inflow control-use electromagnetic valve 15, and the brake is eased.

At the same time, the motor 32 is driven by the electronic control unit 51 via the motor drive circuit 41, and the brake fluid stored in the front reservoir 16 is sucked up by the motion of the plunger 33a and refluxed to the front brake master cylinder 1.

It will be noted that when the brake pedal 36 is operated also, brake force with respect to the wheel 38 is obtained in basically the same manner as in the case of the brake handle 35, and alleviation of the brake force is performed, so description here will be omitted.

Next, a first example of brake control processing that is executed by the electronic control unit 51 in this configuration will be described with reference to the sub-routine flowchart shown in FIG. 2.

Figure 2:
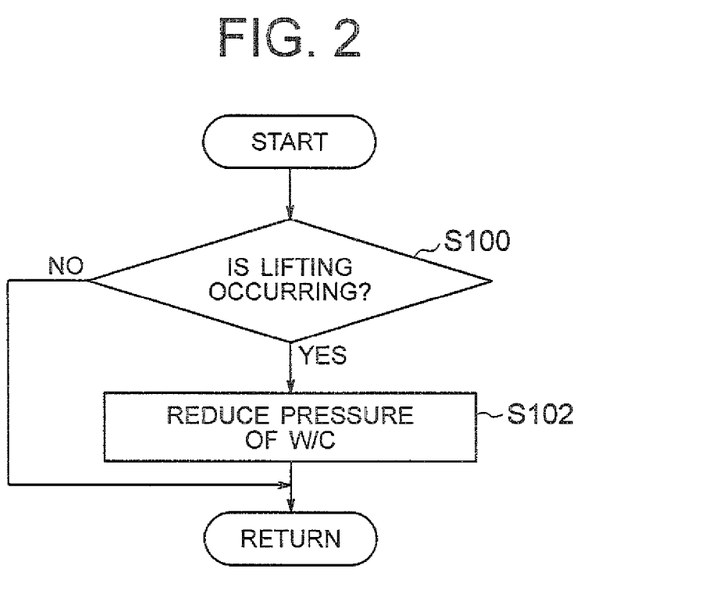
FIG. 2 is a sub-routine flowchart showing a control procedure in a first example of brake control processing that is executed by an electronic control unit used in the two-wheeled motor vehicle brake control system shown in FIG. 1.

When processing is initiated, it is determined whether or not rear wheel lifting has occurred (refer to step S100 of FIG. 2). Here, it is assumed that the two-wheeled motor vehicle to which this brake control processing is applied includes a rear wheel lifting detection function. That is, a program for rear wheel lifting detection is executed by the electronic control unit 51, and when it is determined that rear wheel lifting has occurred, then a detection signal is generated inside the electronic control unit 51. It is not necessary for this rear wheel lifting detection processing to be specific to the invention of the present application and it may be publicly known rear wheel lifting detection processing. That is, as this rear wheel lifting detection method, for example, the method (JP-A-2002-29403) pertaining to the proposal of the applicant of the present application, which calculates a pseudo vehicle body velocity on the basis of wheel velocity and judges rear wheel lifting by the magnitude of a pseudo vehicle body deceleration calculated from that pseudo vehicle body velocity, is suitable.

Consequently, as for the determination of whether or not there is occurrence of rear wheel lifting in step S100, similarly determining whether or not a detection signal has been generated which indicates that rear wheel lifting has occurred in the aforementioned rear wheel lifting detection processing that is executed by an unillustrated main routine is suitable.

Then, when it is determined that rear wheel lifting is not occurring (in the case of NO), then processing is immediately ended. On the other hand, when it is determined that rear wheel lifting has occurred (in the case of YES), then the pressure of the front wheel cylinder 3 is reduced by a certain amount (refer to step S102 of FIG. 2) and the sub-routine returns to the unillustrated main routine.

That is, the front reservoir inflow control-use electromagnetic valve 15 is placed in an opened state by the electronic control unit 51 via the electromagnetic valve drive circuit 42, and the brake fluid of the front wheel cylinder 3 is discharged to the front reservoir 16. Then, when it is determined in the electronic control unit 51 on the basis of the detection signal from the second pressure sensor 48 that the pressure of the front wheel cylinder 3 has dropped a predetermined pressure, the front reservoir inflow control-use electromagnetic valve 15 is placed in a closed state via the electromagnetic drive circuit 42, and the sub-routine returns to a state where normal brake control is performed.

It will be noted that, because the appropriate value for the amount of pressure reduction will differ depending on the conditions of the vehicle—that is, the weight of the vehicle body, the length of the vehicle body, and the height of the vehicle—it is suitable to select an appropriate value on the basis of simulations and experiments.

In this first control processing example, in contrast to what has conventionally been the case where rear wheel lifting is detected, predetermined skidding or greater of the rear wheel is detected and brake pressure is reduced, when rear wheel lifting is detected, the front wheel cylinder 3 is reduced by a certain amount—that is, in other words, the brake pressure is reduced a predetermined pressure—so in a vehicle that easily falls into a considerable rear wheel lifting state already at the point in time when rear lifting is detected, control of the rear wheel lifting is performed rapidly in comparison to what has conventionally been the case, and the safety of the vehicle becomes rapid and reliable.

Next, a second example of brake control processing will be described with reference to FIG. 3. It will be noted that the same numbers will be given to steps having the same processing content as those of the steps shown in FIG. 2, detailed description of those steps having the same processing content will be omitted, and the points that are different will be mainly described below.

This second example is an example configured such that, when rear wheel lifting is detected, the amount of pressure reduction of the front wheel cylinder 3 is changed in response to that lifting.

Figure 3:
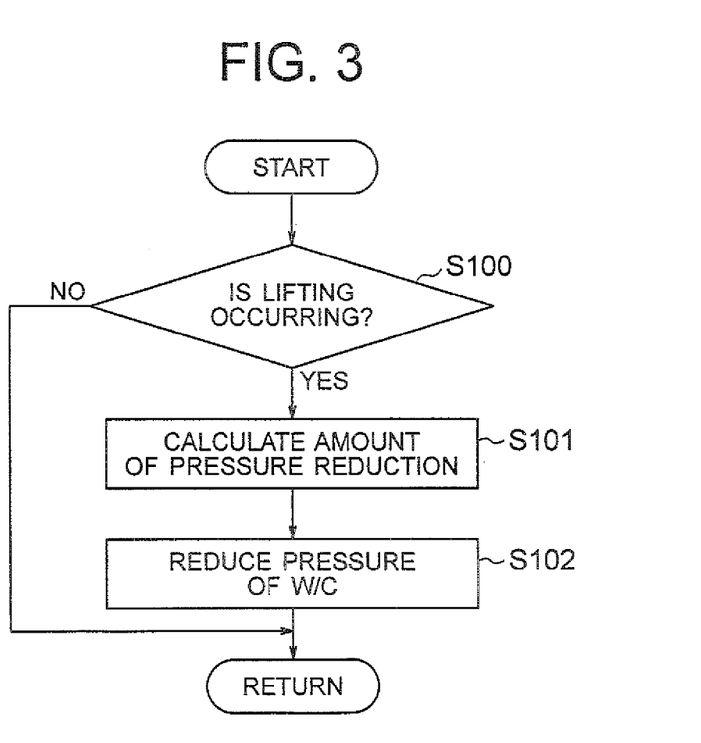
FIG. 3 is a sub-routine flowchart showing a control procedure in a second example of brake control processing that is executed by the electronic control unit used in the two-wheeled motor vehicle brake control system shown in FIG. 1.

That is, in the determination processing of step S100, when it is determined that rear wheel lifting has occurred, an amount of pressure reduction corresponding to that lifting is computed and calculated (refer to step S101 of FIG. 3). Specifically, first, lifting in the phenomenon of rear wheel lifting caused by a sudden brake operation tends to be substantially proportional to the magnitude of vehicle body deceleration or the magnitude of the amount of pressure increase in the front wheel cylinder 3.

Consequently, the magnitude of the amount of change in vehicle body deceleration or the amount of pressure increase in the front wheel cylinder 3 can be used as a predetermined parameter that becomes an index of lifting of the rear wheel. Thus, it is suitable to determine in advance, by simulations and experiments, an appropriate amount of pressure reduction of the front wheel cylinder 3 with respect to the magnitude of the amount of change in vehicle body deceleration or the amount of pressure increase in the front wheel cylinder 3, map or express as an arithmetic expression an appropriate amount of pressure reduction of the front wheel cylinder 3 with respect to the magnitude of various amounts of change in vehicle body deceleration or various amounts of pressure increase in the front wheel cylinder 3 on the basis of this, and use this in step S101. That is, one method of pressure reduction amount calculation is a method that computes and calculates, by the aforementioned map or arithmetic expression, an appropriate amount of pressure reduction of the front wheel cylinder 3 with respect to the amount of change in vehicle body deceleration at this point in time.

Further, another method of pressure reduction amount calculation is a method that computes and calculates, by the aforementioned map or arithmetic expression, an appropriate amount of pressure reduction of the front wheel cylinder 3 with respect to the magnitude of the pressure increase of the front wheel cylinder 3.

Moreover, vehicle body deceleration, brake pressure, or in other words the front wheel cylinder 3 pressure, can also become an index of lifting of the rear wheel. Additionally, when these are used as an index, similar to what has been mentioned before, it is suitable to ensure that an appropriate amount of pressure reduction of the front wheel cylinder 3 corresponding to vehicle body deceleration or the front wheel cylinder pressure can be calculated by the map or arithmetic expression that has been obtained on the basis of simulations or the like.

Then, pressure reduction of the front wheel cylinder 3 by the amount of pressure reduction that has been calculated as mentioned above is performed.

It will be noted that vehicle body deceleration, which is a predetermined parameter that becomes an index of lifting of the rear wheel, is determined as being equal to $(V1-V2)/\Delta t$ assuming that V1 represents a vehicle body velocity at a given time t1 and that V2 represents a vehicle body velocity at a time t2 after the elapse of a derivative time $\Delta t$ from time t1. Further, the amount of change in vehicle body deceleration is determined as being equal to $(a1-a2)\Delta t$ assuming that a1 represents vehicle body deceleration at a given time t1 and that A2 represents vehicle body deceleration at a time t2 after the elapse of a derivative time $\Delta t$ from time t1. Additionally, the vehicle body velocity is determined by a publicly known predetermined arithmetic expression on the basis of the wheel velocity sensors 45 and 46.

Moreover, the pressure of the front wheel cylinder 3 is a pressure p(t0) of the front wheel cylinder 3 at a given time t0, and the magnitude of the pressure increase thereof is determined as $\{p(t0+\Delta t)-p(t0)\}/\Delta t$ assuming that p(t0) represents the pressure of the front wheel cylinder 3 at a given time t0 and that p(t0+$\Delta t$) represents the pressure of the front wheel cylinder 3 at a point in time after the elapse of a derivative time $\Delta t$ from that.

Next, a third example of brake control processing will be described with reference to FIG. 4 and FIG. 5. It will be noted that the same numbers will be given to steps having the same processing content as those of the steps shown in FIG. 2, detailed description of those steps having the same processing content will be omitted, and the points that are different will be mainly described below.

This third example is an example configured to repeat, in a stepwise manner, a predetermined amount of pressure reduction of the front wheel cylinder 3 while rear wheel lifting is being detected.

Figure 4:
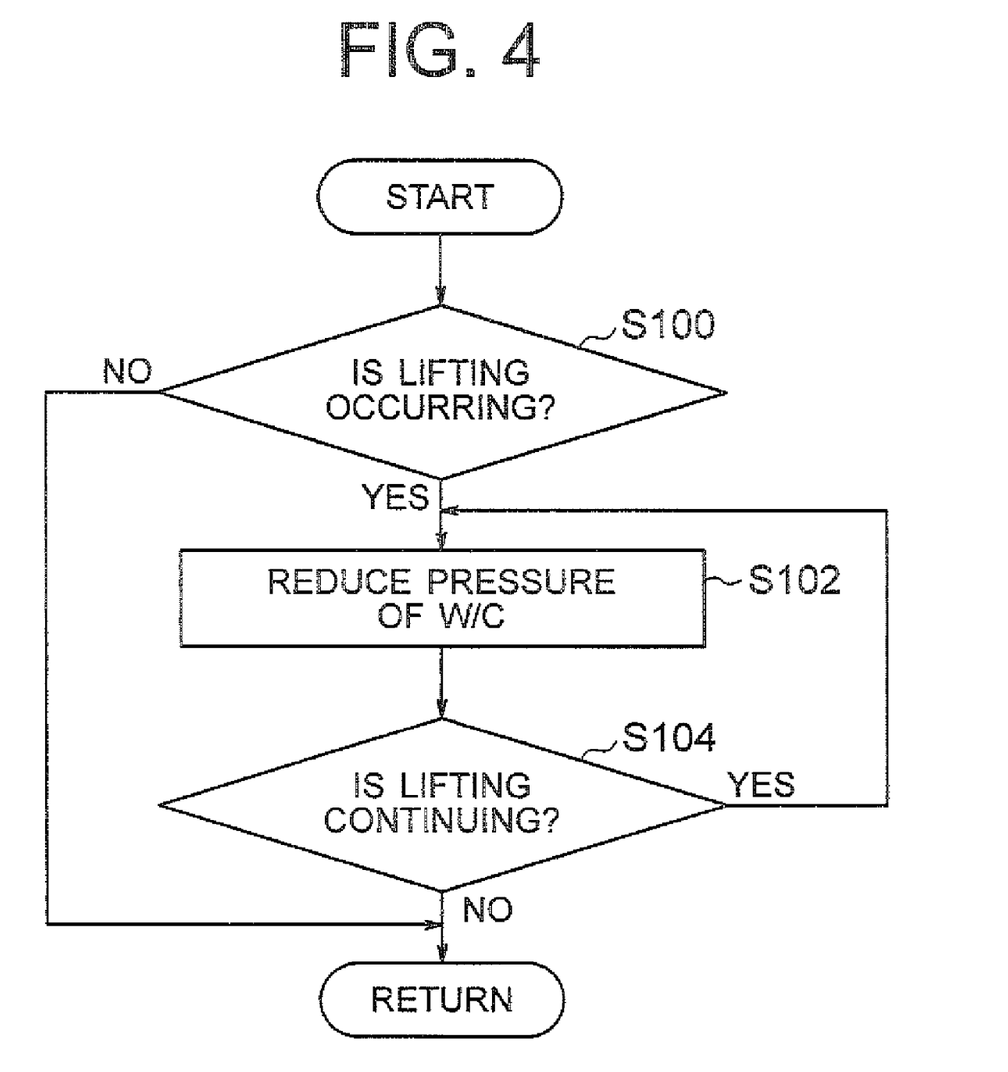
FIG. 4 is a sub-routine flowchart showing a control procedure in a third example of brake control processing that is executed by the electronic control unit used in the two-wheeled motor vehicle brake control system shown in FIG. 1.

That is, in the determination processing of step S100, when it is determined that rear wheel lifting has occurred, then the pressure of the front wheel cylinder 3 is reduced by a predetermined pressure (refer to step S102 of FIG. 4), and next it is determined whether or not rear wheel lifting still continues to be detected (refer to step S104 of FIG. 4).

Then, in step S104, when it is determined that rear wheel lifting still continues to be detected (in the ease of YES), then the sub-routine returns to the processing of the previous step S102 and the pressure of the front wheel cylinder 3 is again reduced by a predetermined pressure, and when it is determined that rear wheel lifting is no longer detected (in the case of NO), then the series of processing ends, and the sub-routine returns to the unillustrated main routine and returns to a normal brake control state.

In FIG. 5, there are shown general characteristic line diagrams where a change in brake pressure and a change in the rear wheel lifting detection signal in this third brake control processing are generally shown, and the same drawing will be described below.

Figure 5A:
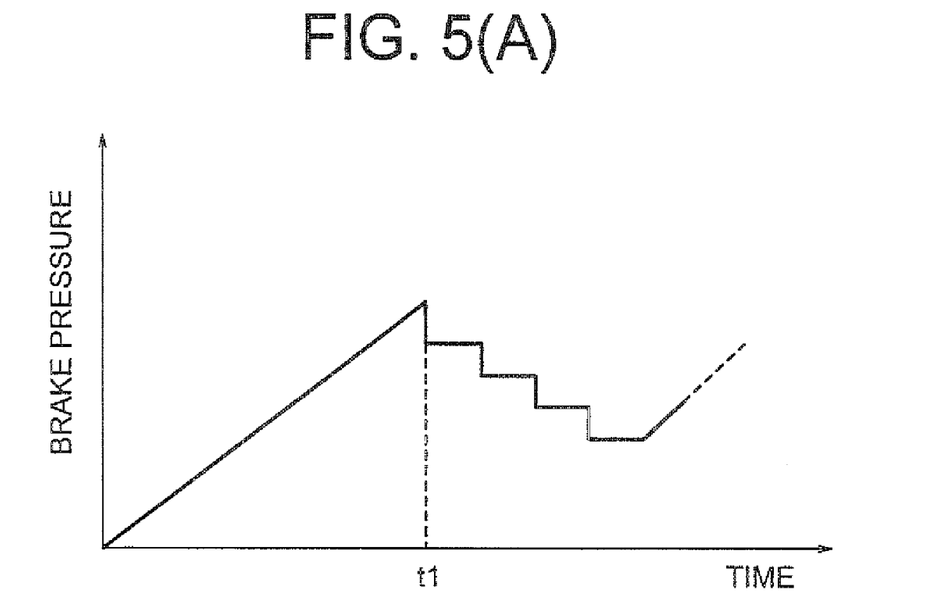
Figure 5B:
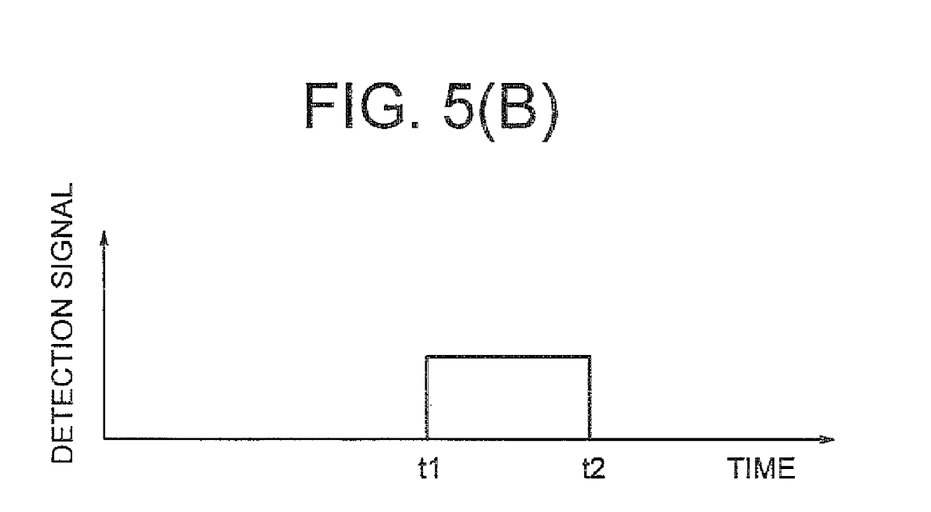

FIG. 5(A) is a general characteristic line diagram generally showing an example of a change in brake pressure obtained by the front wheel cylinder 3, and FIG. 5(B) is a general characteristic line diagram generally showing an example of a change in the detection signal that is generated when it is determined inside the electronic control unit 51 that there is rear wheel lifting.

In FIG. 5(A), the rise in brake pressure until time t1 corresponds to a situation where a sudden brake operation of the brake handle 35 has been performed. Additionally, a state is shown in FIG. 5(B) where, because of this sudden rise in brake pressure, at time t1, when it is determined by the electronic control unit 51 that there is rear wheel lifting, the detection signal is outputted as a logical value "High" in response thereto.

Then, at time t1, rear wheel lifting is detected, whereby pressure reduction of a predetermined pressure of the front wheel cylinder 3 is performed as mentioned previously, and brake pressure falls a predetermined pressure in correspondence thereto (refer to the point time of time t1 of FIG. 5(A)). A state is shown in FIG. 5(A) where, from then on, at time t2, brake pressure is reduced every predetermined pressure in a stepwise manner until rear wheel lifting is no longer detected (refer to FIG. 5(B)).

Figure 6:
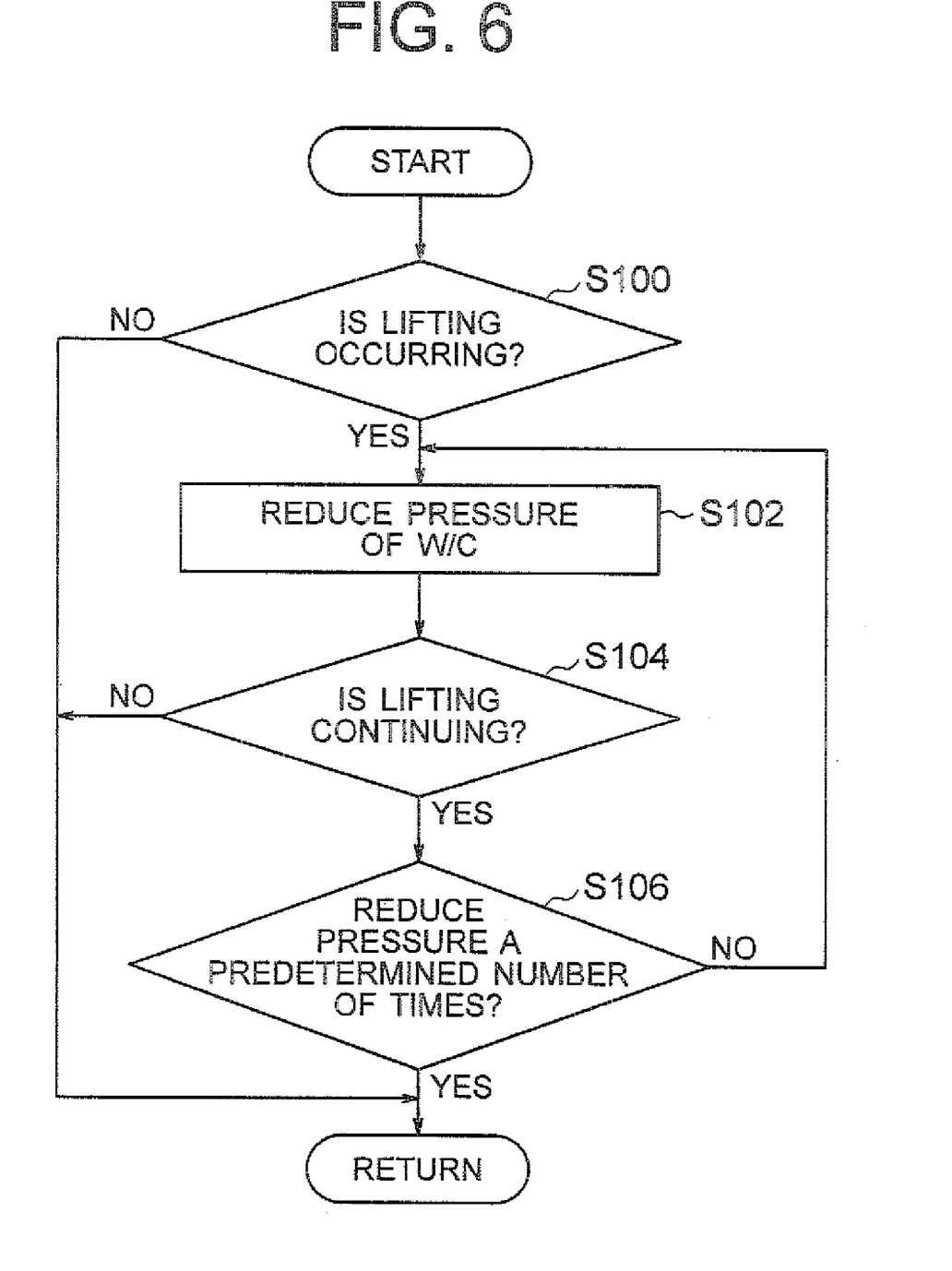
FIG. 6 is a sub-routine flowchart showing a control procedure in a fourth example of brake control processing that is executed by the electronic control unit used in the two-wheeled motor vehicle brake control system shown in FIG. 1.

Next, a fourth example of brake control processing will be described with reference to FIG. 6. It will be noted that the same numbers will be given to steps having the same processing content as those of the steps shown in FIG. 2 or FIG. 4, detailed description of those steps having the same processing content will be omitted, and the points that are different will be mainly described below.

This fourth example is an example where, when a predetermined amount of pressure reduction of the front wheel cylinder 3 is repeated in a stepwise manner while rear wheel lifting is being detected, a limit is disposed on the number of times of that pressure reduction.

That is, in step S104, when it is determined that rear wheel lifting is not being detected (in the case of NO), then the series of processing is ended. On the other hand, in step S104, when it is determined that rear wheel lifting still continues to be detected (in the case of YES), then it is determined whether or not pressure reduction of a predetermined number of times has been performed (refer to step S106 of FIG. 6), and when it is determined that pressure reduction has not reached the predetermined number of times (in the case of NO), then the sub-routine returns to the processing of step S102 and the series of processing is repeated. Further, in step S106, when it is determined that pressure reduction of the predetermined number of times has been performed (in the case of YES), then the series of processing is ended, and the sub-routine returns to the unillustrated main routine and returns to a normal brake control state.

In this manner, by disposing a limit on the number of times of pressure reduction, a situation that results in a so-called no-brake state is prevented.

Figure 7:
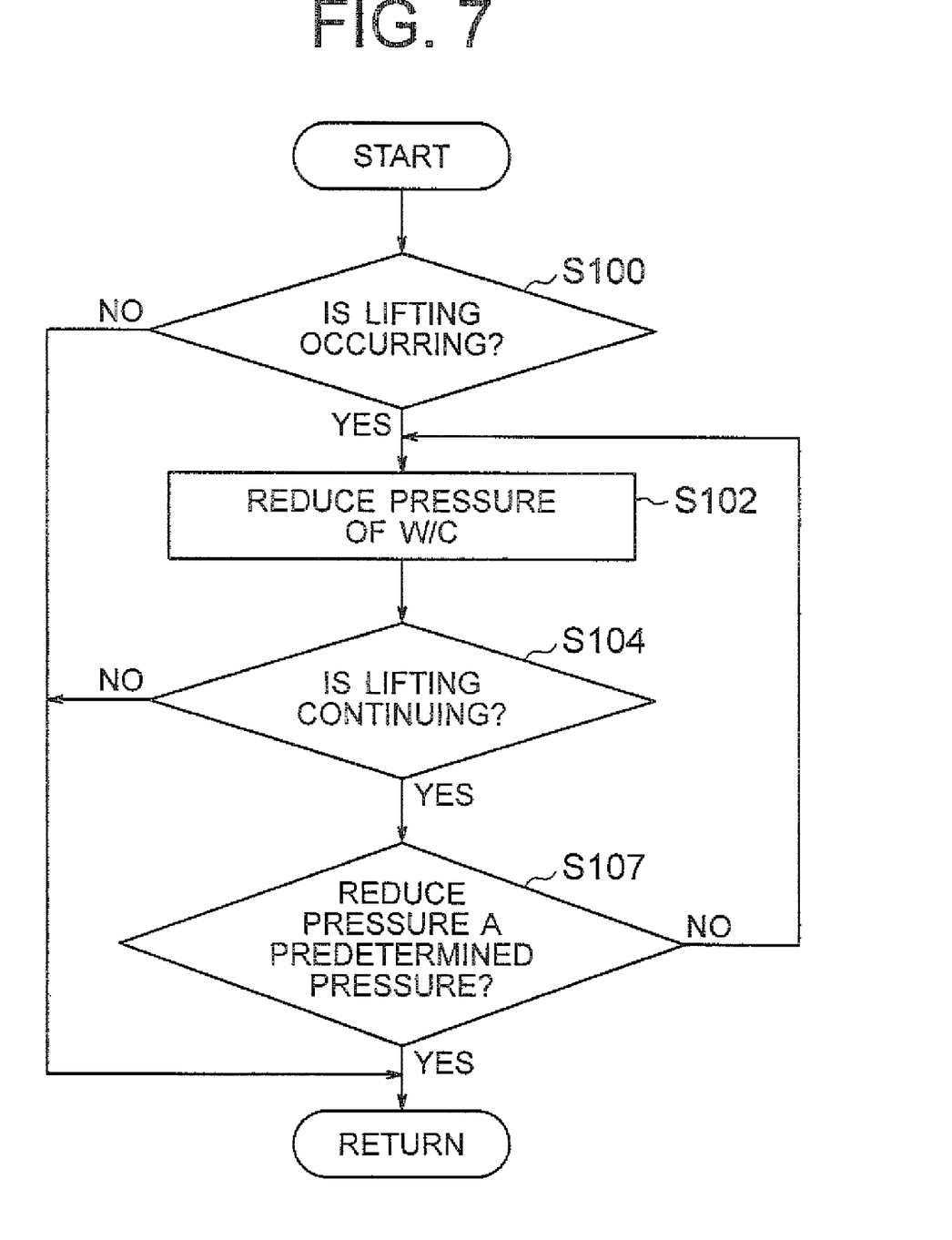
FIG. 7 is a sub-routine flowchart showing a control procedure in a example of brake control processing that is executed by the electronic control unit used in the two-wheeled motor vehicle brake control system shown in FIG. 1.

Next, a fifth example of brake control processing will be described with reference to FIG. 7. It will be noted that the same numbers will be given to steps having the same processing content as those of the steps shown in FIG. 2 or FIG. 6, detailed description of those steps having the same processing content will be omitted, and the points that are different will be mainly described below.

This fifth example is an example where, when a predetermined amount of pressure reduction of the front wheel cylinder 3 is repeated in a stepwise manner while rear wheel lifting is being detected, a limit is disposed on the total pressure reduction amount.

That is, in step S104, when it is determined that rear wheel lifting is not being detected (in the case of NO), then the series of processing is ended. On the other hand, in step S104, when it is determined that rear wheel lifting still continues to be detected (in the case of YES), then it is determined whether or not the total pressure reduction amount has reached a predetermined value (refer to step S107 of FIG. 7), and when the total pressure reduction amount has not reached the predetermined value (in the case of NO), then the sub-routine returns to the processing of step S102 and the series of processing is repeated. Here, "total pressure reduction amount" refers to an integrated value of the amount of pressure reduction performed by repeating the pressure reduction of step S102.

Further, in step S107, when it is determined that the total pressure reduction amount has reached the predetermined value (in the case of YES), then the series of processing is ended, and the sub-routine returns to the unillustrated main routine and returns to a normal brake control state.

In this manner, by disposing a limit on the total pressure reduction amount, a situation that results in a so-called no-brake state is prevented.

The present invention can be applied to brake control of a two-wheeled motor vehicle and is suited for brake control of a two-wheeled motor vehicle having a vehicle body where lifting easily occurs to a relatively large extent even in a relatively early stage when rear wheel lifting is detected.

According to the present invention, when rear wheel lifting is detected, in contrary to what has conventionally been the case, the brake pressure of the front wheel is immediately reduced regardless of whether or not there is occurrence of skidding of the front wheel, so lifting of the entire vehicle body can be rapidly and accurately controlled and prevented particularly in a vehicle where lifting of the entire vehicle body easily occurs even by slight rear wheel lifting, and safety resulting from securement of the safety of the vehicle and the rider can be improved.

Further, when the invention is configured such that reduction of the brake pressure is performed in a stepwise manner and a limit is disposed on the number of times of that pressure reduction and the total pressure reduction amount, a situation that results in a so-called no brake state can be prevented, and a vehicle whose safety and reliability are higher can be provided.

Moreover, when the invention is configured such that the brake pressure is reduced and thereafter slightly increased, safety and reliability can be improved even more particularly in a vehicle that tends to easily lose braking force because of a reduction of the brake pressure.

What is claimed is:

1. A two-wheeled motor vehicle brake control method comprising:
   reducing a brake pressure of a front wheel when lifting of a rear wheel is detected,
   wherein a pressure reduction amount of the brake pressure is set in response to a magnitude of a predetermined parameter that becomes an index of lifting of the rear wheel,
   characterized in that the predetermined parameter is vehicle body deceleration or an amount of change in vehicle body deceleration or the brake pressure of the front wheel or a magnitude of a pressure increase amount of the brake pressure, and
   wherein pressure reduction of the brake pressure of the front wheel is performed in a stepwise manner while lifting of the rear wheel is being detected.

2. The two-wheeled motor vehicle brake control method of claim 1, wherein when pressure reduction of the brake pressure reaches a predetermined number of times, pressure reduction is ended even in a state where rear wheel lifting is being detected.

3. A two-wheeled motor vehicle brake control system configured to be:
   capable of transmitting oil pressure arising in a front brake master cylinder in response to operation of a first brake operator to a front wheel cylinder via an oil pressure system,
   capable of transmitting oil pressure arising in a rear brake master cylinder in response to operation of a second brake operator to a rear wheel cylinder via an oil pressure system,
   capable of discharging brake fluid of the front wheel cylinder to a front reservoir as desired, and
   capable of detecting an occurrence of lifting of a rear wheel,
   wherein the brake control system is further configured to immediately reduce a brake pressure of the front wheel when lifting of the rear wheel is detected, wherein a pressure reduction amount of the brake pressure is set in response to a magnitude of a predetermined parameter that becomes an index of lifting of the rear wheel,
   characterized in that the predetermined parameter is vehicle body deceleration or an amount of change in vehicle body deceleration or the brake pressure of the front wheel or a magnitude of a pressure increase amount of the brake pressure, and wherein pressure reduction of the brake pressure of the front wheel is performed in a stepwise manner while lifting of the rear wheel is being detected.

4. The two-wheeled motor vehicle brake control system of claim 3, wherein when pressure reduction of the brake pressure reaches a predetermined number of times, pressure reduction is ended even in a state where rear wheel lifting is being detected.

* * * * *